March 3, 1964   C. T. HUTCHENS   3,123,377
TANDEM SUSPENSION FOR ELIMINATING BRAKE-HOPPING
Filed Oct. 12, 1961   3 Sheets-Sheet 2
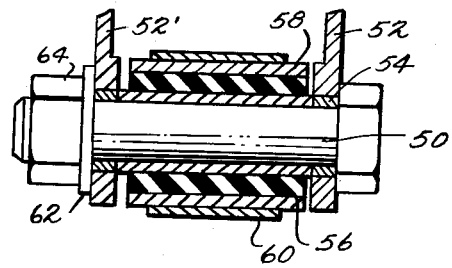
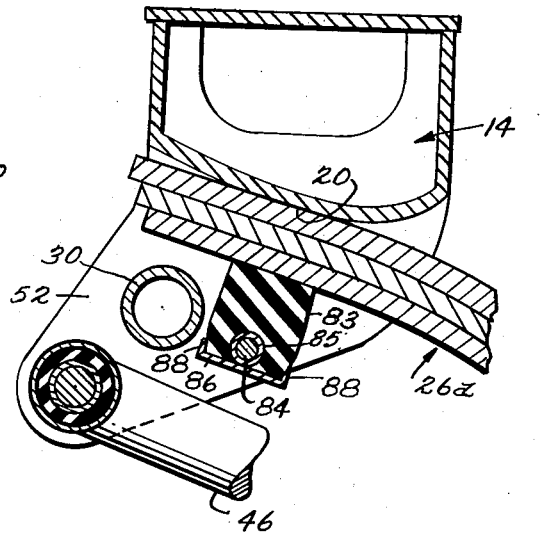
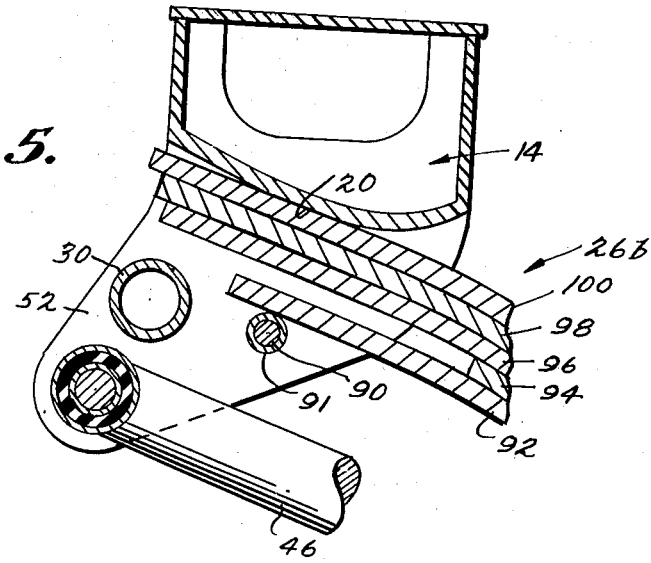
INVENTOR
CHARLES T. HUTCHENS
BY Cushman, Darby & Cushman
ATTORNEYS March 3, 1964
C. T. HUTCHENS
3,123,377
TANDEM SUSPENSION FOR ELIMINATING BRAKE-HOPPING
Filed Oct. 12, 1961
3 Sheets-Sheet 3
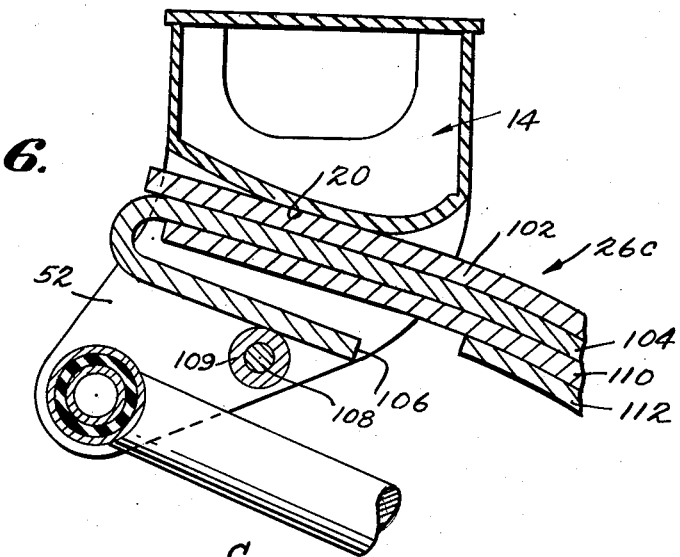
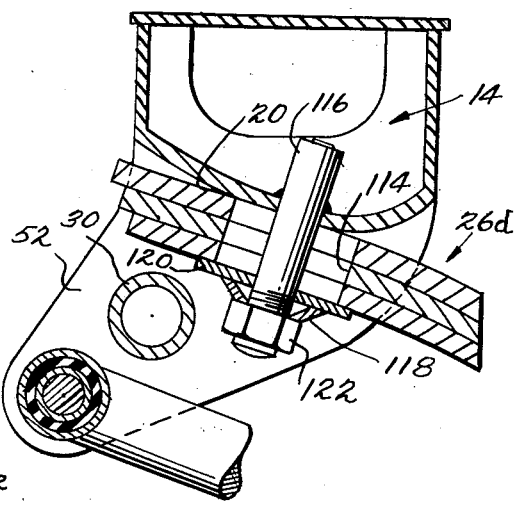
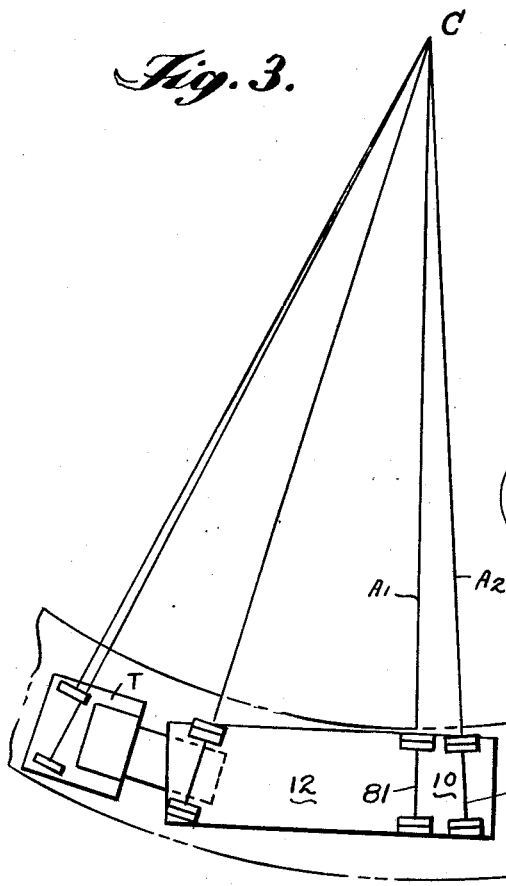
INVENTOR
CHARLES T. HUTCHENS
BY Cushman, Darby & Cushman
ATTORNEYS United States Patent Office 3,123,377
Patented Mar. 3, 1964

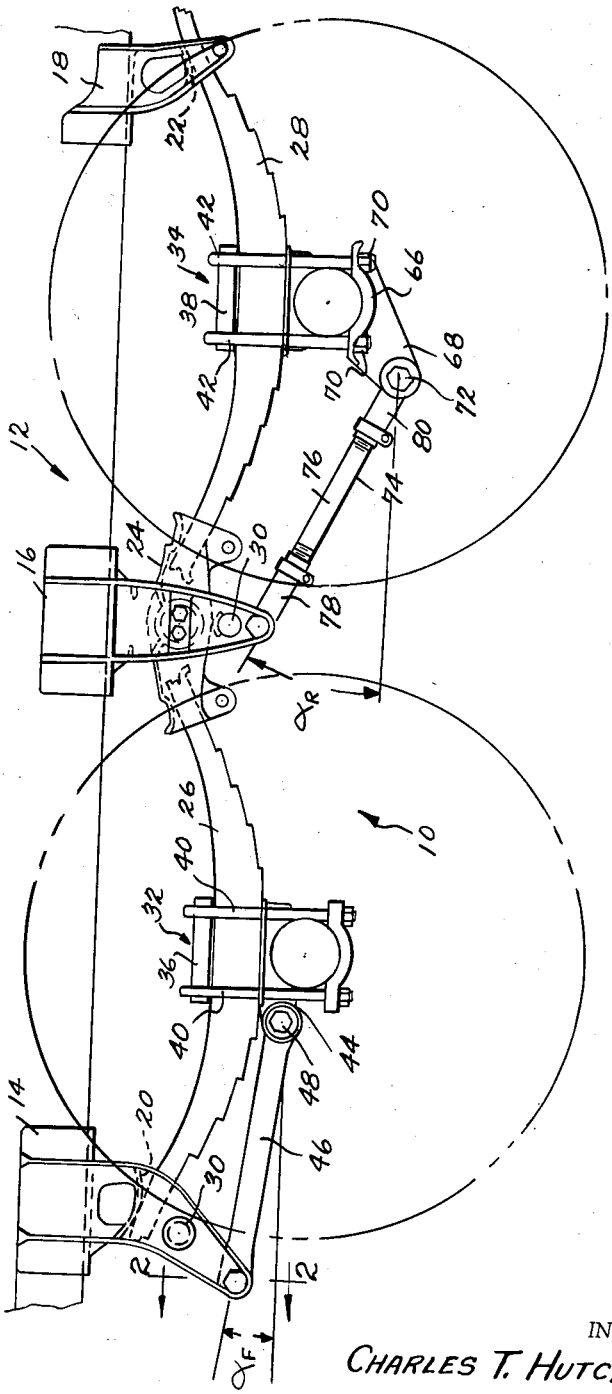

3,123,377
TANDEM SUSPENSION FOR ELIMINATING
BRAKE-HOPPING
Charles T. Hutchens, Box 1355, Springfield, Mo.
Filed Oct. 12, 1961, Ser. No. 144,773
13 Claims. (Cl. 280—104.5)

This invention relates to tandem axle assembles for trailers and the like, and has particular reference to a new and improved means for reducing tire scrub, eliminating brake hopping, and otherwise providing a tandem assembly having notably superior road-handling characteristics.

Conventional tandem trailer assemblies equipped with torque arms have major shortcomings heretofore unsolved in the art. When a lightly loaded or unloaded tandem trailer is braked, there is a tendency for the front tandem axle spring to develop a chatter due to the braking force tending to create an axle roll. This front spring leaves its associated spring bearing surface; and, when sufficient tension is built up in the spring, this spring flexes, causing a chattering and a consequent "hopping" of the front tandem wheels. Even with tandem axles having torque arms joined thereto in a conventional manner, this braking force on the tandem wheels causes the rear tandem axle to rotate and further complicates the problem of brake hopping.

This brake hopping causes the front tandem axle tires to intermittently scrub the highway pavement as the load is then carried only by the rear tandem wheels, and the front wheels are only intermittently in contact with the pavement during this chattering of the spring.

Also, this tendency of tire scrubbing is present when the trailer is moving around a highway curve. Thus, in tandem assemblies having forwardly and upwardly extending torque arms joined in their rearward ends above the tandem axles, with the front torque arms at a greater angle to the horizontal than the rearward torque arms, the body roll induced by centrifugal force causes the trailer axles to diverge. This results in an excessively high scrub angle, i.e. the angle between the axis of the trailer wheel and a radius line drawn from the turning center of the trailer to this wheel. This high scrub angle causes increased friction drag, poor wheel tracking, and otherwise generally poor trailer handling characteristics, as well as excessive tire wear. The scrub angle of the wheel axis is reduced in prior art tandem trailer assemblies wherein the torque arm angles are inclined to the horizontal in equal degree and are connected at their rearward ends below the wheel axles, as they will at least remain parallel as the trailer moves about a highway curve. This scrub angle held might be deemed moderate as compared to the first-mentioned prior art construction. Likewise, these prior art constructions do not effectively obviate the tendency of the axle roll and brake hopping, for the reasons described.

According to this invention, there is provided a new and improved tandem axle assembly which obviates the above described shortcomings of the prior art, by providing a novel arrangement of torque arms which effectively counteract the axle roll, thereby reducing the tendency of brake hopping.

Another object of this invention is to provide a tandem trailer assembly of the character described wherein the forward end of the front spring assemblies are preloaded in upward engagement with their associated hanger brackets to counteract the downward force of this end of the springs during braking of the trailer, thereby effectively obviating brake hopping of the front axle wheels.

Still further according to this invention, a tandem assembly is provided having a front torque arm joined at its rearward end above the front axle and at a relatively small angle with respect to the horizontal plane, the rear torque arm being joined at its rearward end below the rear axle and inclined to the horizontal at a relatively steep angle with respect to the front torque arm. By virtue of this arrangement, the rear torque arm is positioned to oppose the rotating force on the rear axle to balance undesirable stress causing axle roll. Also, by virtue of providing the relatively great angular inclination of the rear torque arm, the trailer axles converge toward the turning center of the trailer on a highway curve, thereby reducing the tire scrub angle to an inconsequential degree, increasing traction and road handling characteristics and generally reducing friction loss in tire wear. Brake hopping is consequently reduced as the torque arms oppose these adverse braking stresses.

Yet a further object of this invention is to provide a new and improved means for resiliently biasing the front ends of the front spring assemblies in an upward direction so as to prevent the same from moving downwardly during trailer braking. Accordingly, spring chatter of these front spring assemblies and consequent brake hopping are effectively obviated.

These and still further objects, advantages and novel features of the present invention will become apparent in the specification and claims taken in connection with the accompanying drawings.

In the drawings:

FIGURE 1 is a side elevation view of a tandem trailer assembly according to one feature of the present invention;

FIGURE 2 is a view taken along line 2—2 in FIGURE 1;

FIGURE 3 is a schematic plan view of a tractor trailer having a tandem assembly in FIGURE 1, moving about a highway curve; and, FIGURES 4–7 are elevation views, generally in section, showing various connections of front leaf spring assemblies to the forward spring hanger bracket.

Referring now to the accompanying drawings, there is shown in FIGURE 1 a tandem assembly 10 operatively connected to the underside of a trailer 12. The tandem assembly 10 includes a forward spring hanger bracket 14, an intermediate equalizer bracket 16, and a rearward spring hanger bracket 18. The forward bracket 14 includes a spring bearing surface 20, and the rearward spring hanger bracket 18 has a symmetrically opposed spring bearing surface 22. The intermediate equalizer bracket 16 includes an equalizer plate 24, constructed as shown e.g. in my prior Patent 2,900,197, which teaching is included herein by reference.

A front leaf spring assembly 26 is carried at its respective forward and rearward ends by the forward spring hanger bracket 14 and the adjacent extending end of the equalizer plate 24; and, a rear leaf spring assembly 28 is carried by the adjacent end of the equalizer plate 24 and the rearward spring hanger bracket 18. Suitable tie pipes 30 are carried by the brackets 14 and 16, join the tandem assembly 10 with its identical opposed assembly (not shown) carried by the opposite side of the trailer 12.

Carried centrally of the forward leaf spring assembly 26 is an axle housing 32; and, carried in like manner by the rearward leaf spring assembly 28 is an axle housing 34. The axle housings 32 and 34 are of a generally similar construction, carrying bearing blocks 36 and 38 respectively, above the spring assemblies, there being provided spaced apart tie rods 40, 42 joining the respective axle housing to the springs. These axle housings 32 and 34 are joined to the trailer axles and to the springs 26 and 28 respectively as is well-known in the art, and, per se, form part of the present invention.

However, the forward axle housing 32 carries a forwardly extending opposed plate means 44 for operatively receiving a torque bar 46. The torque bar 46 is pivotally connected at its rearward end to the plate means 44 as by a bolt 48, this connection being forward and above the axis of rotation of the forward axle. The torque bar 46 extends toward and upwardly at a relatively small angle to the horizontal, $\alpha_F$, and is connected to the forward spring hanger bracket 14 in the manner shown in FIGURE 2. In this regard, there is provided a bolt 50 passing transversely across the opposed sidewalls 52, 52' of the bracket 14, the bolt carrying a sleeve 54 intermediate the ends thereof. Carried about the sleeve 54 is a cylindrical resilient sleeve 56 of rubber or the like, which, in turn, carries an outer cylindrical sleeve 58. The torque bar 46 is of rod-like construction, having a cylindrical end 60 carried about the outer cylindrical sleeve 58. A washer 62 and nut 64 properly join the bolt 50 to the spring hanger bracket 14.

Referring again to FIGURE 1, the rear axle housing 34 carries a downwardly and forwardly extending plate 66, having opposed sidewalls 68. The plate 66 is conveniently joined to the rearward axle housing 34 by any suitable means such as bolts 70 engaging the tie rods 42. The lower ends of the opposed sidewalls 68 are apertured to receive a bolt 72. Pivotally joined at its rearward end to this bolt 72 is a rear torque bar 74, this connection being a rather substantial distance below the axis of rotation of the rear axle. The rear torque bar 74 extends upwardly and forwardly at a relatively steep angle $\alpha_R$, with respect to the horizontal and to the front torque bar 46. The rear torque bar 74 is joined at its forward end to the intermediate spring hanger bracket 16 in a manner similar to the connection of the front torque bar 46, shown in FIGURE 2.

The rear torque bar 74 is adjustable in length by the provision of an externally threaded central rod 76 engaging at its opposite ends cooperative internally threaded sleeves 78 and 80. As will be appreciated, the rod 76 is oppositely threaded at each end so that rotation of the rod 76 in one direction increases the length thereof while rotation in the opposite direction decreases this length.

By virtue of providing the front torque bar 46 inclined at a relatively small angle $\alpha_F$, almost parallel to the horizontal and joined at its rearward end above the front axle housing 32, and the rear torque bar 74 being disposed at a relatively steep angle, $\alpha_R$, and joined at its rearward end below the rear axle housing 34, the wheel scrub angle will be substantially reduced on highway curves and the tendency of the rear axle to roll will be counteracted, as will now be discussed.

Referring now to FIGURE 3, the trailer tractor T carrying a trailer 12 is shown to be moving around a highway curve H, the trailer (and highway) having a turning center C. The trailer 12 is equipped with a tandem assembly as shown in FIGURE 1, and the front tandem axis 81 as well as the rear tandem axis 82 are shown to mutually converge at the turning center C. The radius lines down from the turning center C to the inner wheel are depicted to be substantially co-extensive with the axis lines 81, 82. When the trailer T is going around the curve H there is a natural sway to the outside due to centrifugal force, and this causes the springs on the outside of the tandem assembly T to be flexed more than the springs on the inside of the curve. By virtue of the rear torque arm 74 being operatively connected to the rear axle at a considerable angle to the roadway, the flexing of the outer spring 28 will cause that end of the rear axle to move back a little further than the front axle will move back when both springs are flexed by virtue of the considerable angle, $\alpha_R$, of the rear torque arm 74 and the slightly inclined angle, $\alpha_F$, of the front torque arm 46, relative to the highway. Accordingly, by virtue of this natural turning force, the rear tandem wheels will tend to track much better than prior art assemblies constructed as described, as is now apparent.

Also the greater angle of the rear torque arms 74 and the connection thereof below the rear axle housings 34 effectively counteract the tendency of axle roll, as previously described herein.

Turning now to FIGURES 4–7, various means are shown for imparting a preloading of the front end of the front leaf spring assembly 26 so as to counteract the downward force of the front end of the front leaf spring during braking, to obviate spring chatter and undesirable wheel hopping. As previously pointed out, a significant feature of this invention relates to the preloading of this front spring to substantially reduce the tendency of wheel hopping, particularly when the trailer is braked in a substantially unloaded condition.

In FIGURE 4 there is shown a front leaf spring assembly 26a having a plurality of leaves extending to the front end thereof, seated against the spring bearing surface 20 of the spring hanger bracket 14. The spring 26a is preloaded to a predetermined degree against the bearing surface 20 by a resilient, compressed block 83. The block is carried in compressive engagement with the underside of the lowermost leaf by engagement with a tie bolt 84 joined to the opposed sidewalls 52, 52' of the front bracket 14. The tie bolt 84 conveniently carries a rotatable sleeve 85, to which the block 83 is joined so as to allow longitudinal movement of the spring 26a via this connection. Supporting the compressed block 83 along this underside is a brake plate 86 having opposed, upright flanges 88 which retain the lateral extents of the block 83.

The compressed resilient block 83 is of generally rectangular construction, and is preferably composed of rubber or equivalent material, the tie bolt 84 being joined thereto below its central axis. It has been found that an upward biasing or preloading force in the order of 800 pounds is necessary to effectively obviate brake hopping occassioned by the tendency of the spring 26a to leave the bracket bearing surface 20. Remembering that the exposed surfaces of the loading assembly 10 are subject to considerable dust, grit, ice and the like, the elimination of the sliding surface is always desirable due to the characteristic of abrasion which would otherwise result. The embodiment of the preloading arrangement shown in FIGURE 4 enjoys this advantage of having no sliding surfaces exposed to the elements.

The arrangement of the resilient block 83 is peculiarly subjected to long life as the back-and-forth movement of the spring 26a has a tendency to bind the block 83, so that there is not any wear on the adjacent upper surface of the block 83.

In FIGURE 5 a leaf spring assembly 26b is shown in engagement with the front spring hanger bracket 14. In this embodiment of the invention, the spring 26b is in upwardly preloaded engagement with the bearing surface 20 by tie bolt 90 joined to the sidewalls 52, 52' and carrying a rotatable sleeve 91 abutting the lower spring leaf 92. The next adjacent spring leaf 94 is shortened, terminating at its length some distance from the end of the remaining spring leaves. The remaining spring leaves 96, 98 and 100 are in abutment with one another, the stress imparted to the end of the spring assembly 26b being provided by the stressed engagement of the tie bolt 90 (and sleeve 91) with the leaf 92 which is deflectable in the space which normally would be occupied by the shortened leaf 94.

In FIGURE 6, a front spring assembly 26c is shown having a four-leaf end, the upper leaf 102 abutting the bearing surface 20. The next adjacent leaf 104 has shepherd's crook or U-shaped return bend 106 which is in prestressed engagement along its underside with a fixed tie bolt 108 carrying a rotatable sleeve 109. The next adjacent leaf 110 extends to the bent end of the leaf 104, providing structural support along the underside thereof, and the remaining leaf 112 is of shortened length, terminating short of the end of the return bend 106 thereby providing an area for deflection of the return bend 106, as is the case with the embodiment shown in FIGURE 5.

In FIGURE 7 there is shown a front leaf spring assembly 26d, the leaves having enlarged aligned apertures 114 therethrough. A bolt 116 is welded to the hanger bracket 14 and extends downwardly past the bearing surface 20. The bolt 116 passes through the aperture 114, the bolt 116 being of substantially smaller size than the aperture 114 so as to permit longitudinal movement of the spring 26d with respect to the hanger 14. The spring 26d is biased upwardly by a conical spring 118 transmitting force to the spring 26d through a washer 120. The bolt carries a machine nut 122 at its lower end to provide the desired preloading of the conical spring 118.

From the foregoing description of the various embodiments of this invention, it is evident that the objects of this invention, together with many practical advantages are successfully achieved. While preferred embodiments of my invention has been described, numerous further modifications may be made without departing from the scope of this invention.

Therefore, it is to be understood that all matters herein set forth or shown in the accompanying drawings are to be interpreted in an illustrative, and not in a limiting sense.

What is claimed is:

1. Tandem assembly comprising: opposed longitudinally spaced apart front and rear leaf spring assemblies; opposed forward, intermediate and rearward spring hanger brackets receiving the respective ends of each spring assembly; opposed front and rear axle housing means joined to each of said spring assemblies for receiving transverse trailer axles; opposed front torque rods pivotally joined at their forward ends to each front spring hanger bracket and pivotally joined at their rearward ends to each front axle housing above the respective axis of wheel rotation, and opposed rear torque rods, each pivotally joined at the forward end to said intermediate spring hanger brackets and pivotally joined at its rearward end to each rear axle housing means below the respective wheel axis of rotation, the axis of said rear torque arms being inclined to the horizontal a greater degree than that angle of said front torque arms.

2. Tandem assembly defined in claim 1 including means carried by said rear torque arms to regulate the length thereof.

3. Tandem assembly comprising: opposed longitudinally spaced apart front and rear leaf spring assemblies; forward, intermediate, and rearward spring hanger means receiving the respective ends of said opposed spring assemblies, opposed front and rear axle housing means joined to each of said opposed spring assemblies for receiving transverse trailer axles; a front torque rod pivotally joined at its forward end to each of said forward spring hanger means and joined at its rearward end to each of said opposed front axle housings above the wheel axis of rotation; a rear torque rod pivotally joined at its forward end to said intermediate spring hanger means and pivotally joined at its rearward end to said rear axle housing means below the wheel axis of rotation, said torque rods extending downwardly from said respective spring hanger means and said rear torque rod defining thereby a greater angle with the horizontal than said front torque rod.

4. Tandem assembly defined in claim 3 including means for preloading the end of said front spring assemblies in engagement with said forward spring hanger means to bias the same in an upward direction.

5. Tandem assembly defined in claim 4 wherein said preloading means includes a precompressed resilient block carried by said forward spring hanger means below said front spring end.

6. Tandem assembly defined in claim 4 wherein said front spring assembly has an aperture therethrough at its forward end and said preloading means includes bolt means passing through said aperture and joined to said forward spring hanger means, and means joining said spring end in upwardly biased relationship to said aperture being of substantially greater size than said bolt to provide relative longitudinal movement of said spring.

7. Tandem assembly defined in claim 6 wherein said spring end joining means includes a conical spring carried by the lower end of said bolt adjacent the underside of said spring end.

8. Tandem assembly defined in claim 4 wherein said front spring assembly includes a plurality of leaves, the lowermost leaf terminating short of said forward spring hanger means, and an intermediate leaf is bent in a U-shape, one leg thereof extending rearwardly, said preloading means including tie bolt means upwardly biasing the rearwardly bent leg of said spring end.

9. Tandem assembly defined in claim 4 wherein said spring front end includes a plurality of individual leaves, an intermediate leaf being of shortened length, terminating prior to engagement of said spring front end and with said forward spring hanger bracket, and tie bolt means engaging the underside of the lowermost leaf biasing the same upwardly, whereby the space normally occupied by said shortened leaf provides a deflection space for said spring front end.

10. Tandem assembly defined in claim 4 wherein said spring front end includes at least four leaves extending to the end thereof, one of said leaves terminating short of said forward spring hanger bracket and one leaf having a rearward bend of U-shaped configuration, the tie bolt means engaging the underside of the free end of said U-shaped intermediate leaf end.

11. Tandem assembly defined in claim 4 wherein said spring front end includes an aperture therethrough adjacent said front spring hanger bracket, bolt means joined to and extending downwardly from said forward spring hanger, a bracket having a stressed conical spring operatively joined to said bolt means and engaging the underside of said spring front end, said bolt being of substantially smaller size than said aperture.

12. Tandem assembly defined in claim 4 wherein said preloading means includes a resilient block mounted in compression adjacent the underside of said spring front end.

13. Tandem assembly defined in claim 12 including a tie bolt carrying said block, said tie bolt being disposed below the axis of said block so that said block bends during back and forth movement of said front spring assembly, and guide plate means engaging the lower end of said block to limit deformation thereof.

References Cited in the file of this patent

UNITED STATES PATENTS

| | | |
|---|---|---|
| 2,054,305 | Stilwell | Sept. 15, 1936 |
| 2,312,253 | Konetsky | Feb. 23, 1943 |
| 2,577,322 | Frazier | Dec. 4, 1951 |
| 2,736,571 | Compton | Feb. 28, 1956 |
| 2,752,164 | Bower | June 26, 1956 |

FOREIGN PATENTS

| | | |
|---|---|---|
| 830,899 | Germany | Feb. 7, 1952 |